June 28, 1949.　　　　　H. C. JOHNSON　　　　　2,474,399
FRUIT JUICE EXTRACTOR

Filed Dec. 18, 1944　　　　　　　　　　　　　　2 Sheets-Sheet 1

Inventor
Herbert C. Johnson
BY
Davis, Lindsey, Smith & Shonts
Attorneys.

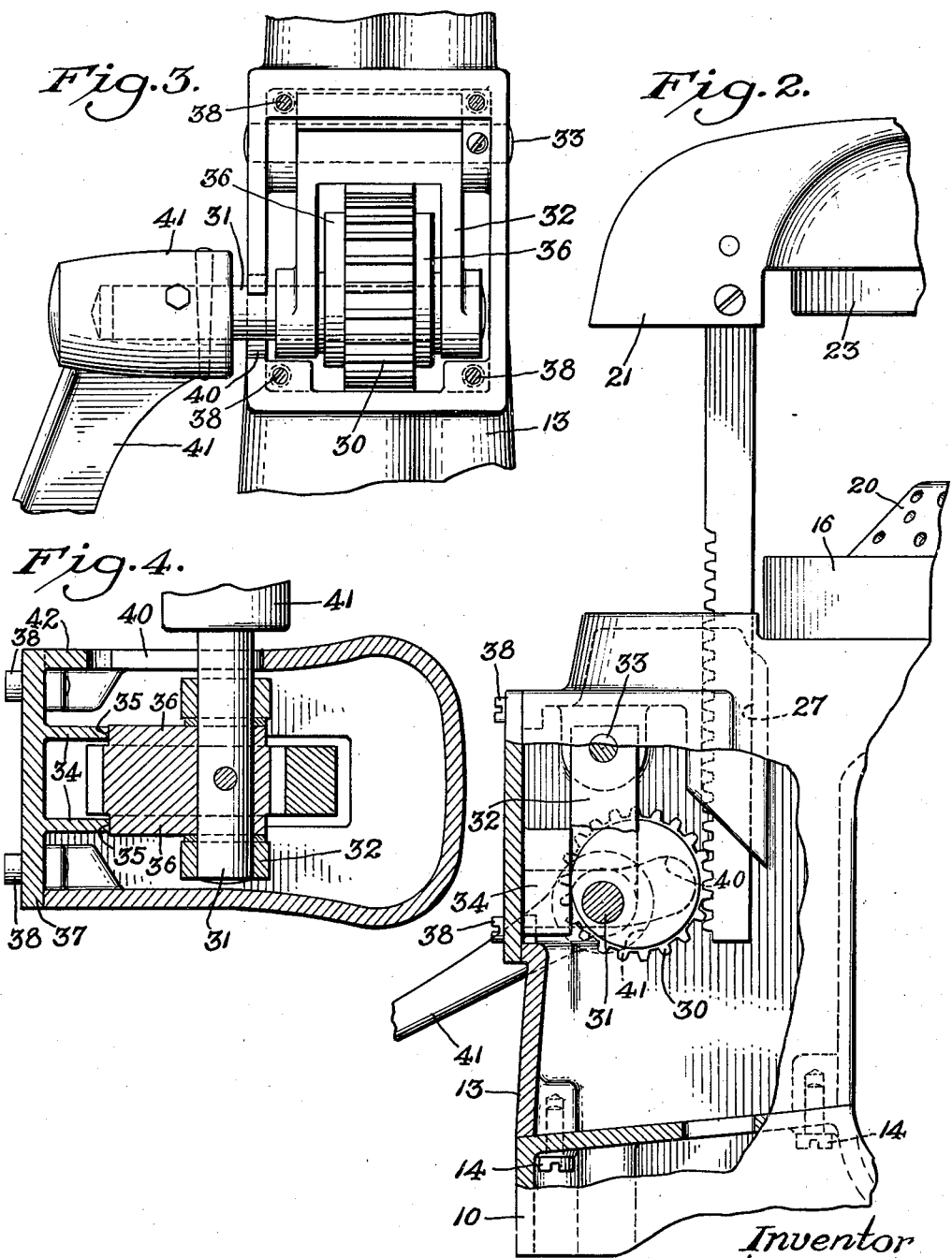

Patented June 28, 1949

2,474,399

UNITED STATES PATENT OFFICE 2,474,399

FRUIT JUICE EXTRACTOR

Herbert C. Johnson, Wilmette, Ill.

Application December 18, 1944, Serial No. 568,642

16 Claims. (Cl. 100—42)

1

The invention relates generally to devices for squeezing the juice from fruits and more particularly to a device or juice extractor for use with citrus fruits such as oranges.

The general object of the invention is to provide a juice extractor in which a pair of squeezing elements are adapted to be relatively moved into squeezing relation by a manually operable lever, and in which the relative movement of the squeezing elements with the desired pressure may be attained with a minimum movement of the lever.

More specifically, it is an object to provide an extractor of the foregoing character in which the squeezing elements are movable to widely separated positionss to facilitate insertion of the fruit, and in which the squeezing elements may be brought into squeezing position with sufficient pressure by movement of the manually operable lever through less than three-quarters of a full turn.

Another object is to provide an extractor of the foregoing character in which the manually operable lever is movable from a rearwardly extending position for the open position of the squeezing element to a forwardly and downwardly extending position for the closed position of the elements where the user can conveniently exert a maximum pressure on the lever.

A further important object is to provide an extractor of the foregoing character in which a rapid movement of one of the squeezing elements is effected, for a given rate of movement of the lever, when the squeezing elements are adjacent the open position, and an increased leverage is attained, when the elements are adjacent the closed position, to provide a maximum squeezing pressure for the force exerted by the user.

Still another object is to provide a novel juice extractor which comprises parts of simple and rigid construction, requiring relatively simple machining operations to bring them to the desired accuracy, and may be assembled into a compace, neat appearing device.

Other objects and advantages will become apparent from the following description taken in connection with the accompanying drawings, in which:

Fig. 2 is a fragmentary view similar to Fig. 1

Figure 1:
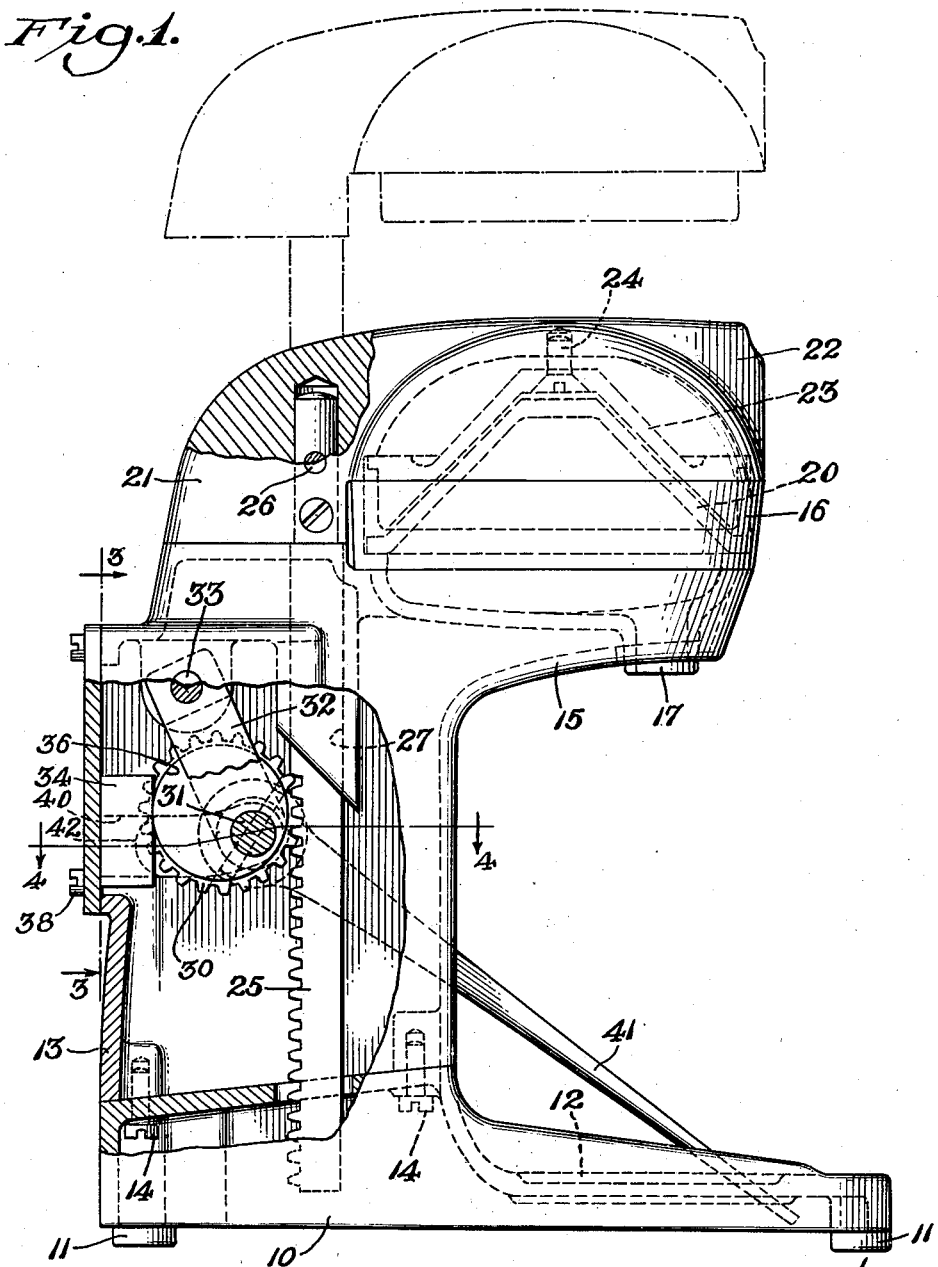
Figure 1 is a side elevational view, partially broken away, of a juice extractor embodying the features of the invention and showing the parts of the device in their closed or squeezing position.

2 but showing the squeezing elements in their open position.

Fig. 3 is a fragmentary view taken on the line 3—3 of Fig. 1.

Fig. 4 is a horizontal sectional view taken on the line 4—4 of Fig. 1.

A juice extractor embodying the features of the invention is of a type adapted for domestic use and particularly suited for removing the juice from citrus fruits by squeezing half a fruit at a time. The extractor may be of a type having a vertically movable squeezing element adapted to coact with a fixed lower squeezing element on which the fruit is placed for the squeezing operation. The movable squeezing element, which is the upper element in this case, is adapted to be carried by a bar upon which a rack is cut for operation by a manually rotated pinion.

In the squeezing operation, it is desirable, during the final part of the squeezing movement, to exert considerable pressure on the fruit to remove the maximum amount of juice therefrom. It is also desirable, in an extractor of this type, to move the upper squeezing element a substantial distance from the fixed or lower squeezing element in order to facilitate insertion and removal of the fruit and cleaning of the parts. In order to provide the desired extent of movement of the movable element, it has heretofore been necessary to provide a pinion which must be rotated through more than one revolution in order to provide the necessary extent of opening and at the same time provide sufficient pressure during the final part of the squeezing movement. Since rotation of the pinion is effected by means of a hand lever, operation thereof through more than one revolution is somewhat cumbersome and inconvenient.

The present invention provides a structure whereby the hand lever need be turned only through a portion of one revolution in order to effect the desired movement of the movable squeezing element and still obtain the desired pressure. In the present structure, the movement of the parts is such that the movement of the movable squeezing element when adjacent its open position is relatively large for a given movement of the hand lever, and when the squeezing element approaches the ultimate squeezing position, increased leverage is provided to give the desired pressure. In other words, the leverage between the hand lever and the movable squeezing element is varied during the movement of the parts to give the maximum pressure when the movable squeezing element reaches its lowermost position and a maximum rate of movement when the movable element reaches its uppermost or open position. Such movement is effected by a pinion and rack bar, as in many prior extractors, but the pinion is so mounted and the hand lever is so attached thereto that a variable rate of movement and pressure is attained.

As shown in the drawings, the preferred embodiment of my invention comprises a base 10 provided with feet 11 adapted to rest upon a table or the like. The base 10 is provided with a forwardly extending tray portion 12 adapted to support a glass or other receptacle to receive the juice as it is squeezed from the fruit. Mounted on the rear portion of the base 10 is a hollow upright 13 secured to the base as by screws 14. While the base 10 and upright 13 could be manufactured as a single unit, it is preferable from a manufacturing standpoint to manufacture them separately and secure them together as shown. The upper portion of the upright is provided with a forwardly extending bracket portion 15 supporting a removable cup having a spout 17 through which the juice is directed into the glass or receptacle supported on the tray portion 12. The cup 16 removably supports a lower or fixed squeezing element 20 of conical form and on which a half fruit is adapted to be placed with the cut face against the squeezing element 20.

Located above the upright is a movable head 21 having a forwardly extending portion 22 in which an upper squeezing element 23 is secured as by a screw 24. The upper squeezing element 23 is likewise conical to cooperate with the lower element and the two are adapted to squeeze the half fruit therebetween by movement of the head 21.

Movement of the head 21 is preferably effected by a rack bar 25 carrying the head and secured thereto as by a pin 26. The rack bar 25 extends downwardly through the upright 13 and is guided for vertical movement therein by means of ways 27 formed in the upper portion of the upright. The rack bar 25 is adapted to be actuated by means of a pinion 30 rotatably mounted in the upright 13 and meshing with the rack. The pinion 30 is adapted to be manually rotated to effect the desired movement of the head 21.

If the pinion 30 were mounted for rotation about its own axis, it would have to be of relatively large size to provide the necessary movement for the head 21, if the movement of the hand lever for operating the pinion is to be through a distance less than one revolution. However, with a pinion of such size and with such movement of the hand lever, too great a force would have to be placed on the hand lever by the user in order to provide the desired squeezing pressure, and the average housewife would be unable to exert such a pressure. On the other hand, if the pinion were reduced in size to provide a greater leverage, the head 21 would not be moved a sufficient distance with movement of the hand lever through less than one revolution.

The present invention provides a mounting for the pinion which gives the desired leverage through the final part of the squeezing movement and yet the desired extent of opening for the head 21. To this end the pinion 30 is provided with a shaft 31 positioned eccentrically of the pinion so that the effective radius of the pinion, i. e., the distance from the axis of the shaft 31 to the pitch line of the teeth of the rack bar 25, is small when the squeezing elements are in closed position to provide the desired power, but increases as the head 21 moves upwardly so as to provide the desired extent of opening. To support the pinion for such movement, means is provided comprising a yoke 32 pivotally supported at its upper end by means of a pivot pin 33 extending through the upright 13. The arms of the yoke 32 extend downwardly on opposite sides of the pinion and rotatably support the shaft 31. Since rotation of the pinion 30 and shaft 31 moves the shaft toward and from the rack 25, with the pinion remaining in mesh therewith, the yoke 32 thus will be caused to swing about its pivot pin 33. Since the yoke 32 will not alone serve to hold the pinion in mesh with the rack, means is provided for this purpose which in the present instance comprises a pair of spaced abutments 34 each having a vertical edge 35 adapted to engage annular surfaces provided by disk-like portions 36 formed on opposite faces of the pinion 30 outside of the teeth thereof. Since the vertical edge surfaces 35 of the abutments 34 are parallel to the direction of movement of the rack 25, the pinion is constantly held in mesh with the latter. In their preferred form, the abutments 34 are formed on a cover plate 37 adapted to close an opening in the rear face of the upright 13, the opening being provided to facilitate assembly of the pinion 30 and its supporting yoke 32. The cover plate may be attached to the upright 13 and secured in place as by screws 38.

To effect rotation of the shaft 31 and pinion 30, the shaft extends through a slot 40 in one side wall of the upright 13, and on its outer end carries a hand lever 41. The slot 40 is preferably formed to extend to the rear edge of the side wall of the upright 13 and is adapted to be closed by a small lug portion 42 formed on the cover plate 37.

In addition to the variation in pressure and rate of movement of the head 21 obtained by the change in effective radius of the pinion due to the eccentricity of the shaft 31, the arrangement of the parts provides a further factor tending to attain this result. It will be evident that when the hand lever 41 is in its vertical position and the head 21 is being moved downwardly, the shaft 31 is then in the upper part of the pinion. When the pinion is rotated into its final squeezing position, as illustrated in Fig. 1, the shaft 31 is then adjacent the lower part of the pinion. However, during such movement, the shaft 31 remains at substantially the same level since it cannot move vertically other than the slight movement due to the swinging movement of the bracket 32. Therefore, the pinion has in effect been moved bodily upward during the angular movement just described so that a differential movement thereof relative to the rack is thereby effected. Thus, since the pinion moves bodily in a direction opposite to the movement of the rack, the differential movement effects an increase in the squeezing pressure in addition to that effected by the change in effective radius of the pinion.

It will, therefore, be evident that a very large squeezing pressure may be provided by the mechanism herein disclosed during the latter part of the squeezing movement, while the head may be lifted to a relatively wide open position by the construction of the mechanism. Preferably, the hand lever 41 is so connected to the shaft 31 that it extends rearwardly and downwardly when the head is in the fully open position and forwardly and downwardly when in its closed position. Thus the hand lever 41 is at a convenient angle for the user to exert a large manual pressure on the hand lever during the final squeezing movement. The particular arrangement and ratios of the parts of the mechanism are such that full movement of the head may be imparted thereto by swinging the lever 41 through an angle somewhat less than three-quarters of a full turn. Such movement is substantially less than that required in squeezers of this general type as heretofore constructed and yet as much squeezing pressure, if not more, is attained by the present construction.

I claim:

1. An extractor comprising fixed and movable squeezing elements, a rack connected to the movable element, a pinion for moving the rack, a hand lever for rotating said pinion, and means for rotatably and swingably supporting said pinion on an axis eccentrically thereof, whereby the distance from said axis to said rack varies to provide rapid movement of the movable element when adjacent the open position thereof and increased pressure between the elements when the movable element is adjacent its closed position.

2. An extractor comprising fixed and movable squeezing elements, a rack connected to the movable element, a pinion meshing with the rack, a hand lever connected to said pinion for rotating it, and means for supporting said pinion on an axis variable in its spacing from the axis of movement of said rack to increase the rate of movement of the rack when the movable element is adjacent its open position and to increase the pressure between the elements when the movable element is adjacent its closed position.

3. An extractor comprising a fixed squeezing element, a movable squeezing element, a rack connected to said movable element for moving it between open and closed positions, a pinion, means for holding said pinion in mesh with said rack, a hand lever for rotating said pinion, and means supporting said pinion for rotation about an axis eccentrically of said pinion, said supporting means being movable toward and away from said rack upon rotation of said pinion, to vary the effective radius of said pinion between a maximum when said movable element is in its open position and a minimum when said movable element is in its closed position.

4. An extractor comprising a fixed squeezing element, a movable squeezing element, a reciprocable member connected to said movable element for moving it between open and closed positions, a manually rotatable member adapted to effect reciprocation of said reciprocable member, and means supporting said rotatable member for constant driving engagement with said reciprocable member and for rotation about an axis movable toward and away from said reciprocable member upon rotation of said rotatable member, to vary the leverage ratio between said members to provide the maximum leverage when the movable element is adjacent its closed position and the maximum rate of movement when the movable element is adjacent its open position.

5. An extractor comprising fixed and movable squeezing elements, a rack connected to the movable element, a pinion, a hand lever for rotating the pinion, means for holding the pinion in mesh with the rack, and a swingable support for said pinion connected thereto eccentrically thereof to vary by the rotation of the pinion the effective radius of the pinion and thereby vary the pressure exerted by and the rate of movement of the movable element.

6. An extractor comprising fixed and movable squeezing elements, a rack connected to the movable element, a pinion, a hand lever for rotating the pinion, means for holding the pinion in mesh with the rack, and a pivotally suspended yoke rotatably supporting the pinion at the free end of the yoke on an axis eccentric of the pinion to vary by the rotation of the pinion the effective radius of the pinion and thereby vary the pressure exerted by and the rate of movement of the movable element.

7. An extractor comprising a frame including a fixed squeezing element, a movable squeezing element above said fixed element, a rack bar mounted for vertical movement in said frame and carrying said movable element, a pinion, a hand lever fixed to said pinion for rotating it, an abutment secured to said frame for holding the pinion in mesh with said rack bar, and a pivotally suspended yoke in said frame rotatably supporting the pinion at its free or lower end on an axis eccentric of the pinion whereby rotation of the pinion by the hand lever varies the effective radius of the pinion to thereby vary the pressure exerted by and the rate of movement of the movable element.

8. An extractor comprising fixed and movable squeezing elements, a rack connected to the movable element, a pinion having a shaft secured thereto and extending from opposite faces thereof on an axis eccentric to the pinion, means mounting said shaft for movement bodily relative to said rack, means for holding the pinion in mesh with said rack, means for supporting said pinion on said shaft whereby rotation of said pinion varies the effective radius thereof relative to said rack, and a hand lever secured to one end of said shaft for rotating the pinion.

9. An extractor comprising fixed and movable squeezing elements, a rack connected to the movable element, a pinion for moving the rack, swingable means supporting the pinion on an axis eccentric thereof whereby rotation of said pinion varies the effective radius thereof relative to the rack, a hand lever for rotating the pinion, said pinion having an annular surface concentric with the teeth thereof, and an abutment bearing against said surface to hold the pinion in mesh with said rack.

10. An extractor comprising a hollow frame including a fixed squeezing element, a vertically movable rack mounted in said frame and carrying a movable element, a pinion mounted within said frame and having a shaft positioned eccentrically in the pinion and extending externally of the frame through a slot in one side thereof, a yoke pivoted within said frame and supporting said shaft on opposite sides of said pinion, a hand lever mounted on the outer end of said shaft, said frame having an opening through which said pinion may be assembled, and a cover plate for said opening having an abutment for holding the pinion in mesh with said rack.

11. An extractor comprising fixed and movable squeezing elements, a rack carrying the movable element, a pinion, a hand lever for rotating the pinion, means for holding the pinion in mesh with said rack, and means supporting said pinion for rotation on an axis eccentric to the pinion to vary the effective radius of the pinion relative to the rack, said axis being positioned to cause the pinion to move bodily in a direction opposite to the movement of the rack during the final part of the squeezing movement to provide a differential movement relative to the rack and thereby increase the squeezing pressure.

12. An extractor comprising fixed and movable squeezing elements, a rack carrying the movable element, a pinion, a hand lever for rotating the pinion, means for holding the pinion in mesh with said rack, and means supporting said pinion for rotation on an axis eccentric to the pinion to vary the effective radius of the pinion relative to the rack, said axis being so positioned that the rotation of the pinion during the final part of the squeezing movement effects bodily movement of the pinion in the opposite direction to the movement of the rack and at the same time decreases the effective radius of the pinion relative to the rack to increase the squeezing pressure.

13. An extractor comprising fixed and movable squeezing elements, a rack connected to the movable element and reciprocable along an axis parallel to the plane of its teeth ends, a pinion, a hand lever for rotating the pinion, means for holding the pinion in mesh with the rack, a support element for said pinion connected thereto eccentrically thereof and shiftable toward and away from the axis of movement of said rack to vary by rotation of the pinion the effective radius of the pinion and thereby vary the pressure exerted by and the rate of movement of the movable element.

14. An extractor comprising fixed and movable elements, a rack connected to the movable element and mounted for movement along a fixed path, a driving pinion adapted to mesh with said rack, means including a shaft for mounting said pinion for rotation about an axis eccentric to the pinion, means for holding said pinion in mesh with said rack and for shifting the axis of rotation of said pinion upon rotation of said pinion, whereby rotation of said pinion varies the effective radius thereof relative to said rack, and a hand lever secured to one end of said shaft for rotating the pinion.

15. A juice extractor comprising a supporting frame, a fixed element on said frame, a relatively stationary squeeze element mounted on said frame, a movable squeeze element adapted to cooperate with said relatively stationary squeeze element, a driven actuating element reciprocable vertically on said frame and carrying said relatively movable squeeze element, an actuating shaft rotatably and shiftably mounted on said frame for rotation about a horizontal axis, said driven actuating element having a rack thereon with a plurality of teeth lying in a vertical plane parallel to the plane of movement of said driven actuating element and to said horizontal axis, a driving element mounted eccentrically on and rotatable with said shaft and having a pinion portion engageable in driving relation with said rack, and a surface portion concentric with said pinion portion and engageable with said fixed element to maintain said pinion portion engaged with said rack and to vary the distance of said shaft from said rack, as said shaft is rotated, said surface and pinion portions being arranged on said shaft to cause said driven element to be moved with a relatively rapid movement throughout the initial portion of its squeezing stroke and a relatively slow movement and increased pressure throughout the terminal portion of its squeezing stroke, and a manually operable hand lever carried on said shaft for rotating said shaft.

16. A juice extractor comprising a supporting frame, a relatively stationary squeeze element mounted thereon, a movable squeeze element adapted to cooperate with said relatively stationary squeeze element, a driven actuating element reciprocable vertically on said frame and carrying said relatively movable squeeze element, an actuating shaft rotatably and shiftably mounted on said frame, said driven actuating element having a rack thereon, means on said shaft including concentric pinion and bearing surface portions both of which are eccentrically disposed about said shaft, and a fixed bearing surface on said frame engaged by said first bearing surface for maintaining said pinion portion in mesh with said rack and for varying the distance of said shaft from said rack as said shaft is rotated, whereby upon rotation of said shaft said pinion portion drives said driven actuating element at a variable linear velocity upon rotation of said shaft at a constant angular velocity, and a manually operable hand lever on said shaft for rotating said shaft to move said driven actuating element through a squeezing stroke.

HERBERT C. JOHNSON.

REFERENCES CITED

The following references are of record in the file of this patent:

UNITED STATES PATENTS

| Number | Name | Date |
|---|---|---|
| 752,884 | Carmichael | Feb. 23, 1904 |
| 2,131,440 | Johnson | Sept. 27, 1938 |